(12) United States Patent
Hassenpflug et al.

(10) Patent No.: US 12,267,479 B2
(45) Date of Patent: Apr. 1, 2025

(54) STEREOSCOPIC IMAGE RECORDING METHOD AND STEREOSCOPIC IMAGE RECORDING APPARATUS

(71) Applicant: Schölly Fiberoptic GmbH, Denzlingen (DE)

(72) Inventors: Frank Hassenpflug, Villingen-Schwenningen (DE); Michel Kronenthaler, Ulm (DE); Tobias Martin, Obernheim (DE)

(73) Assignee: Schölly Fiberoptic GmbH, Denzlingen (DE)

( * ) Notice: Subject to any disclaimer, the term of this patent is extended or adjusted under 35 U.S.C. 154(b) by 246 days.

(21) Appl. No.: 17/993,102

(22) Filed: Nov. 23, 2022

(65) Prior Publication Data

US 2023/0171392 A1 Jun. 1, 2023

(30) Foreign Application Priority Data

Nov. 26, 2021 (DE) .......................... 102021131134.9

(51) Int. Cl.
*H04N 13/189* (2018.01)
*G02B 23/24* (2006.01)
*G06T 3/60* (2024.01)
*G06T 7/30* (2017.01)
*G06T 7/593* (2017.01)
*H04N 13/00* (2018.01)
*H04N 13/106* (2018.01)

(52) U.S. Cl.
CPC ............ *H04N 13/189* (2018.05); *G06T 3/60* (2013.01); *G06T 7/30* (2017.01); *G06T 7/593* (2017.01); *H04N 13/106* (2018.05); *G02B 23/2415* (2013.01); *G06T 2207/10068* (2013.01); *H04N 2013/0081* (2013.01)

(58) Field of Classification Search
None
See application file for complete search history.

(56) References Cited

U.S. PATENT DOCUMENTS

| | | | |
|---|---|---|---|
| 2013/0202221 A1* | 8/2013 | Tsai | H04N 13/111 |
| | | | 382/296 |
| 2019/0290371 A1* | 9/2019 | Calef | A61B 34/30 |
| 2020/0380718 A1* | 12/2020 | Schoch | A61B 1/00071 |

FOREIGN PATENT DOCUMENTS

| | | |
|---|---|---|
| DE | 102019114917 | 12/2020 |
| WO | 2018064475 | 4/2018 |

* cited by examiner

*Primary Examiner* — Xiaolan Xu
(74) *Attorney, Agent, or Firm* — Volpe Koenig

(57) ABSTRACT

In a stereoscopic image recording method (34), it is provided to transform depth information (13) with respect to an image pair (40) of a stereoscopic image (24) based on an alignment angle (23) in order to generate an aligned stereoscopic image (29), the transformed depth information (26) being used in order to generate a complementary image (27) of the stereoscopic image (40) in a computer-aided manner.

11 Claims, 4 Drawing Sheets

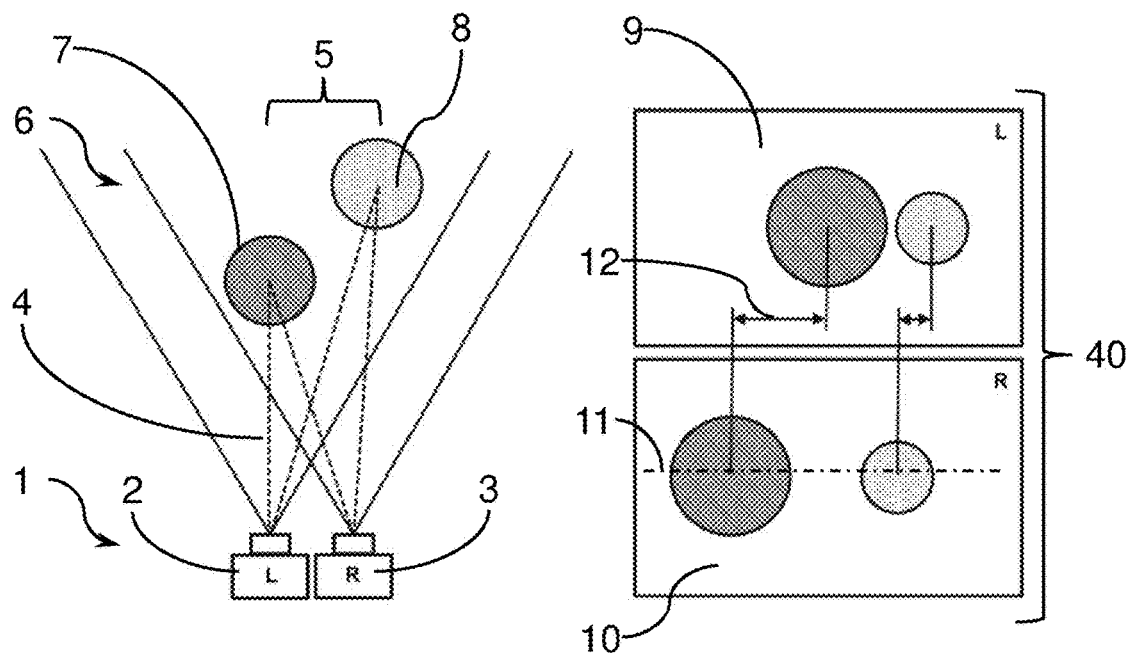
Fig. 1
Fig. 2
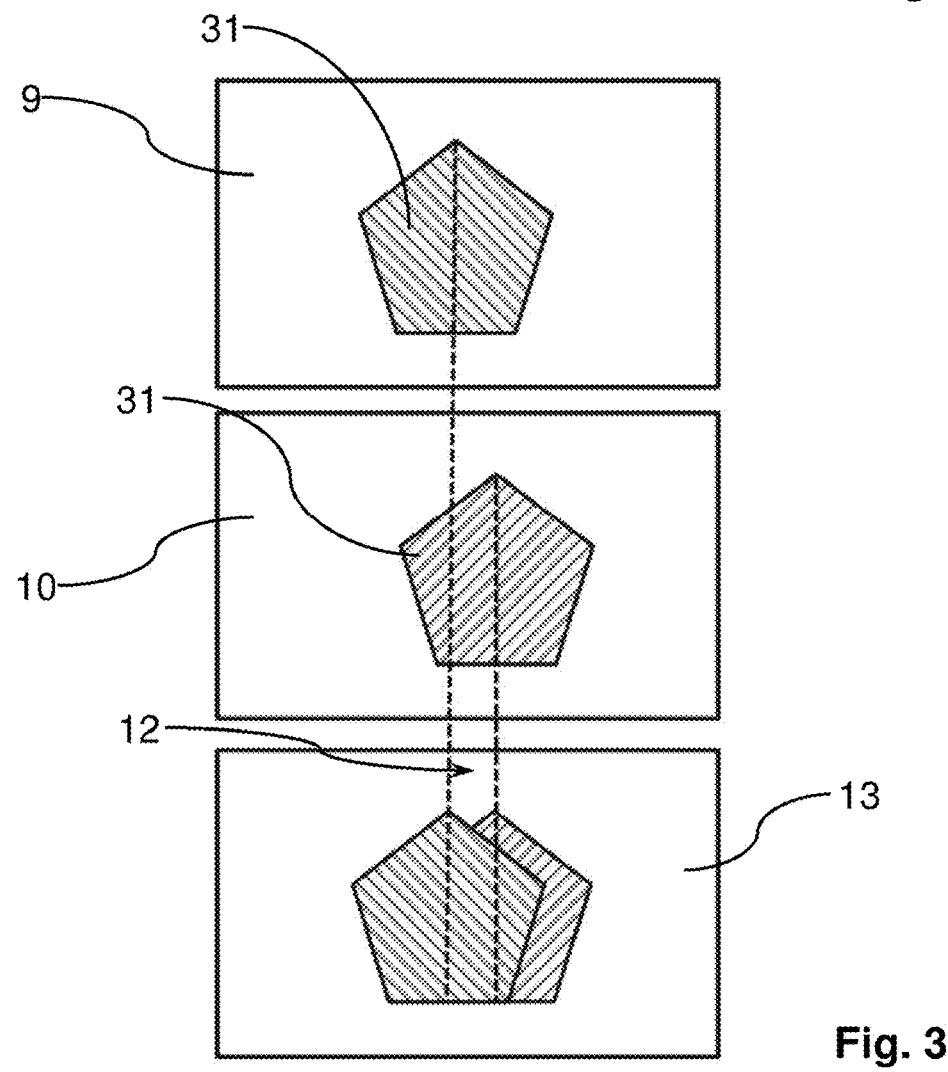
Fig. 3

STEREOSCOPIC IMAGE RECORDING METHOD AND STEREOSCOPIC IMAGE RECORDING APPARATUS

INCORPORATION BY REFERENCE

The following documents are incorporated herein by reference as if fully set forth: German Patent Application No. 10 2021 131 134.9, filed Nov. 26, 2021.

TECHNICAL FIELD

The invention relates to a stereoscopic image recording method, an image pair being recorded and a stereoscopic image being output with respect to the image pair.

The invention furthermore relates to a stereoscopic image processing apparatus.

BACKGROUND

It is known to generate stereoscopic images, for example by means of an endoscope having two optical beam paths, which enable an image pair comprising a left image and a right image to be recorded. These images of the image pair define a stereoscopic image, for example in interaction with switchable spectacles and/or by way of stereoscopic vision techniques.

SUMMARY

The invention is based on the object of improving the handling of a stereoscopic endoscope.

In order to achieve this object, one or more of the features disclosed herein according to the invention are provided. In particular, therefore, in order to achieve the stated object in the case of a stereoscopic method of the type described in the introduction, the invention provides that depth information is calculated from the image pair, that an alignment angle is determined, which describes a position of the image pair in relation to a preferred direction, that the depth information is transformed on the basis of the alignment angle, that the transformed depth information is used for calculating at least one transformed image pair, and that the transformed image pair is output as the stereoscopic image. A method is thus provided in which a positionally correct positioning of images of a stereoscopic image is calculable if an image recording apparatus, for example the endoscope mentioned, is rotated by the alignment angle. This makes it possible to maintain top and bottom and/or a position of an image horizon in a stereoscopic image even during a rotation. Said stereoscopic image also includes the disparity, which is preserved by the method, in particular, such that the perception of the depth information and of the 3D images (stereoscopic images) is possible even after a rotation. This is advantageously usable for example if the endoscope is angled at its distal end or is designed in another way as a side view endoscope, the endoscope being rotated about a longitudinal axis and not about the viewing direction.

In one advantageous embodiment, it can be provided that, for calculating the transformed image pair, the transformed depth information is applied to a selected image of the recorded image pair in order to generate a complementary image, such that the selected image and the complementary image define the stereoscopic image. Consequently, one image of the image pair is usable as reference image.

In one advantageous embodiment, it can be provided that, for generating the complementary image, image contents of the selected image are displaced by a distance corresponding to the depth information. Consequently, a stereoscopically matching image for an arbitrary alignment or orientation of the selected image is generable in a simple manner.

It is preferably provided that local image contents are displaced in the manner described, for example image pixels. Consequently, a varying displacement of image contents of an image relative to one another is achievable in a simple manner. A stereoscopic supplementation is thus generable.

In one advantageous embodiment, it can be provided that an angle between an image edge of at least one image of the image pair, for example of the selected image, and a search direction for calculating the depth information is chosen to be equal to the alignment angle.

Alternatively, it can be provided that a search direction for calculating the depth information along an image edge of at least one image of the image pair is chosen.

In one advantageous embodiment, it can be provided that the alignment angle is measured by an angle measuring device.

In one advantageous embodiment, it can be provided that the depth information is calculated as a depth map.

In this case, provision can be made for ascertaining content-related correspondences in the image pair along a search direction, for example the search direction already mentioned.

The search direction can be predefined by an epipolar line, for example. A search space is thus choosable in minimal fashion.

In this case, an epipolar line can be described for example as a line in one image of the image pair which results from image representations of a punctiform object when the position thereof is changed such that the object does not change in the other image of the image pair.

In one advantageous embodiment, it can be provided that the image pair is recorded recurrently over time, in particular with a calculation of the transformed image pair being effected in real time. It is thus possible to implement a horizon placement during operation.

In one advantageous embodiment, it can be provided that a selected image of the recorded image pair is rotated by the alignment angle. It is thus possible to realize a horizon placement and/or to compensate for a rotation of the image recording apparatus by the alignment angle.

In one advantageous embodiment, it can be provided that the depth information is rotated by the alignment angle in order to generate the transformed depth information. It is thus possible to provide transformed depth information by means of simple calculation methods. A stereoscopic image is thus calculable in a simple manner.

In one advantageous embodiment, it can be provided that the image pair is recorded by a stereoscopic endoscope. Consequently, one advantage of the invention is being able to utilize the generation of stereoscopic images during a horizon placement in order to compensate for rotations of the endoscope about the longitudinal axis thereof or the shaft thereof.

In order to implement the stereoscopic image recording method according to the invention, a stereoscopic image processing apparatus, configured for carrying out a method according to the invention, in particular as described above and/or as claimed in any of the claims directed to a stereoscopic image recording method, is proposed.

One example of a stereoscopic image processing apparatus according to the invention and a preferred field of use of the invention is a stereoscopic endoscope, in particular side view endoscope.

BRIEF DESCRIPTION OF THE DRAWINGS

The invention will now be described in greater detail on the basis of an exemplary embodiment, but is not restricted to the exemplary embodiment. Further exemplary embodiments arise through combination of the features of individual or a plurality of claims among one another and/or with individual or a plurality of features of the exemplary embodiment.

In the figures:

FIG. 1: shows a stereoscopic image recording apparatus in a highly schematic illustration, FIG. 2: shows a left image and a right image, recorded in the situation in accordance with FIG. 1, FIG. 3: shows the construction of a stereoscopic image from a left image and a right image in a basic illustration.

DETAILED DESCRIPTION

Figure 4:
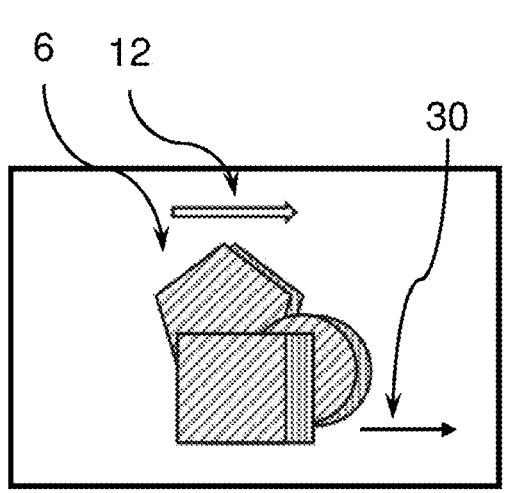
FIG. 4: shows the recording of a stereoscopic image by means of a stereoscopic image processing apparatus in a first rotation position.

A stereoscopic image processing apparatus, designated in its entirety by 1, has a left image recorder 2 and a right image recorder 3 in a manner known per se, the viewing directions 4 of which image recorders are arranged parallel to one another and offset by a distance 5 relative to one another.

The stereoscopic image processing apparatus 1 is directed at a scene 6 in a manner known per se, said scene having two objects 7, 8 in the example.

In this case, the left image recorder 2 records a left image 9 and the right image recorder 3 records a right image 10 as an image pair 40.

In this case, the image positions of the objects 7, 8 in the left image 9 and the right image 10 are offset relative to one another along an epipolar direction or epipolar line 11.

If the imaging distance with respect to the objects 7, 8 is changed, then the apparent position of these objects 7, 8 in the left image 9 and in the right image 10 changes. If the imaging distance is changed such that the apparent position of one of the objects 7, 8 in one image remains constant, then the object in the other image apparently moves on the epipolar line 11. An offset, the disparity 12, thus arises as a function of the imaging distance.

FIG. 3 shows how depth information 13 can be obtained from the disparity 12 of the local image contents 31: the greater the disparity 12 of corresponding image contents, the further away the latter are from the image recorders 2, 3. This depth information 13 is typically present as a depth map.

More precisely, in this case, corresponding image contents 31 in the left image 9 and in the right image 10 are sought, for example along a search direction given by a horizontal image edge or in some other way, for example by an epipolar line 11. The disparity 12 of these image contents 31 leads, in a manner known per se, to local depth information which can be ascertained pixel by pixel and combined to form a depth map.

FIG. 4 shows an abstracted scene 6 that was recorded by a stereoscopic image processing apparatus 1. The direction of the disparity 12 is predefined by the relative arrangement of the image recorders 2, 3 with respect to one another.

Figure 12:
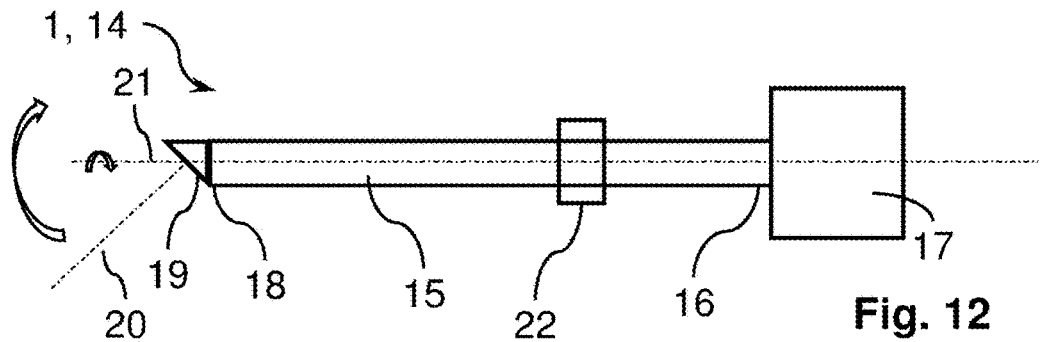
FIG. 12: shows a stereoscopic endoscope as stereoscopic image processing apparatus.

FIG. 12 shows one example of an image processing apparatus 1. A stereoscopic endoscope 14 is illustrated.

The endoscope 14 has a shaft 15 in a manner known per se. A camera head 17 is embodied at a proximal end 16. A side view unit 19 is embodied at a distal end 18.

The side view unit 19 ensures that a viewing direction 20 of the image processing apparatus 1 is angled relative to the longitudinal axis 21.

In further exemplary embodiments, the image recorders 2, 3 are arranged directly at the distal end 18.

If the image processing apparatus 1 from FIG. 12 is then rotated about the longitudinal axis 21, then the viewing direction 20 is spatially pivoted.

Figure 5:
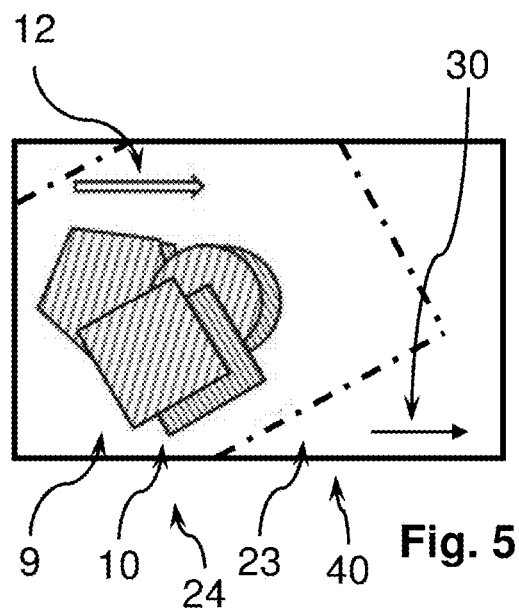
FIG. 5: shows a second stereoscopic image of the scene from FIG. 4 in the case of a rotated stereoscopic image processing apparatus.

This leads to an apparent rotation and translation of the scene 6 in the left image 9 and the right image 10 of the stereoscopic image 24, as illustrated in FIG. 5. In this case, the dash-dotted line indicates the alignment of the preceding images 9, 10.

The apparent rotation of the scene 6 is unpleasant for a user. Therefore, for monoendoscopes, it has become customary to reposition the horizon.

An angle measuring device 22 (cf. FIG. 12) is designed for this purpose, and detects an alignment angle 23 by which the image processing apparatus 1 was rotated. In this case, the alignment angle 23 describes a position or orientation of the image recording apparatus 1 in relation to a preferred direction 30.

In further exemplary embodiments, the alignment angle 23 is calculated by a comparison of contents of two successive (left or right) images 9, 10.

For horizon placement, the images 9, 10 of the image pair 40 would then have to be individually rotated by the alignment angle 23. In this case, the alignment angle 23 can be related to a preferred direction 30, for example to a horizontal direction (lower image edge before the rotation, cf. FIG. 4).

Figure 6:
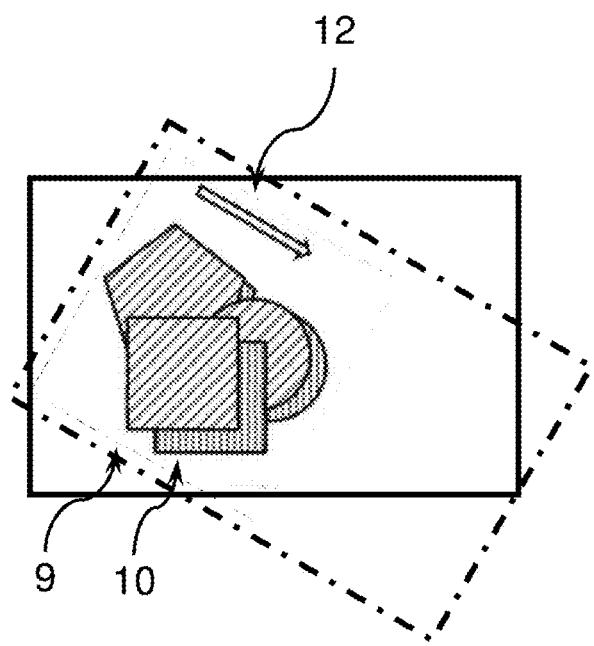
FIG. 6: shows the stereoscopic image in accordance with FIG. 5 after an image rotation for the purpose of horizon placement with erroneously aligned disparity.

This results in the situation in FIG. 6. The dash-dotted line indicates an apparent position of the images 9, 10 from this processing step.

FIGS. 4 and 5 need not necessarily succeed one another directly. It is also possible that, between FIGS. 4 and 5, further image pairs were recorded at different alignment angles 23, which were transformed in the manner described.

It is evident that the disparity 12 is no longer pointing horizontally as a result of the rotation of the images 9, 10. It is thus no longer possible to perceive the stereoscopic image 24 as a spatial image.

Therefore, depth information 13 is calculated from the images 9, 10 in the manner described. This is shown in FIG. 7.

One of the images 9, 10, for example the left image 9, is then processed further as a selected image 25 and is rotated by the alignment angle 23.

In further exemplary embodiments, the right image 10 or a middle image is used as the selected image 25.

Figure 7:
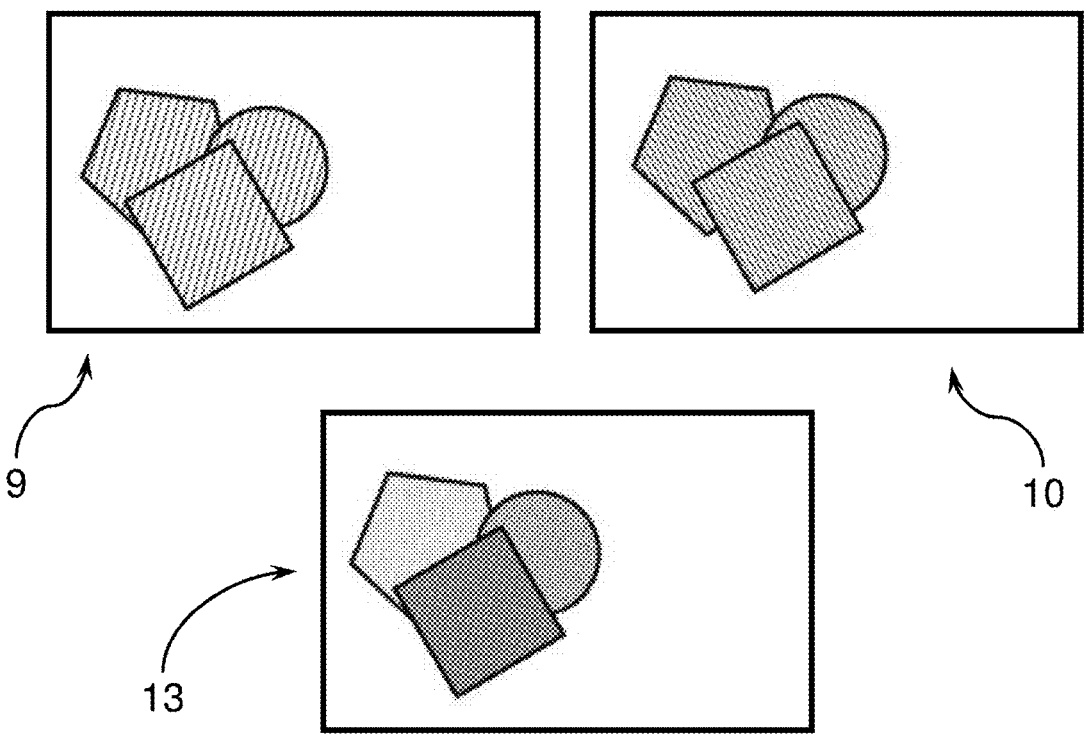
FIG. 7: shows the obtaining of depth information from an image pair of the stereoscopic image in accordance with FIG. 6, FIG. 8: shows the rotation of the depth information from FIG. 7 by the alignment angle.
Figure 8:
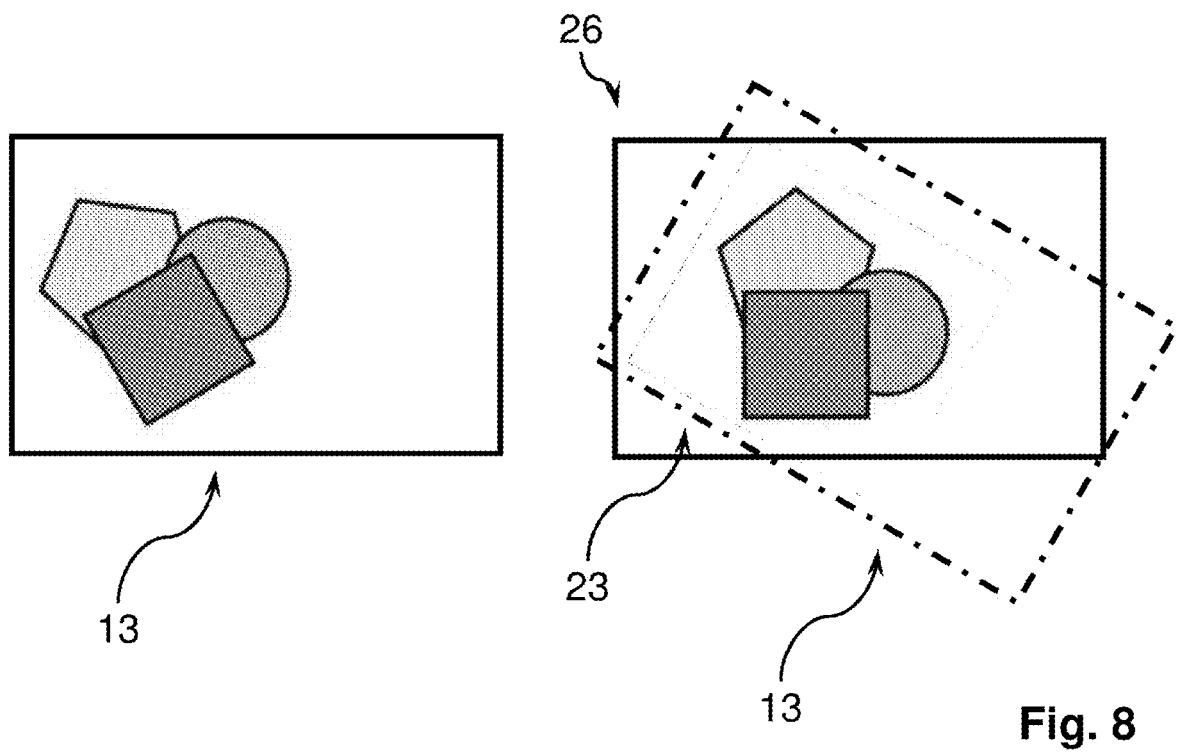

Furthermore, the depth information 13 from FIG. 7 is rotated by the alignment angle 23, FIG. 8. The dash-dotted line shows the boundary of the depth information 13 before the rotation. Transformed depth information 26 arises.

The transformed depth information 26 is then applied to the rotated selected image 25 (FIG. 9) in order to generate a complementary image 27. In this case, the individual local image contents 31, for example image pixels 33, are horizontally displaced by a distance 32 corresponding to the respective transformed (local) depth information 26.

Figures 9, 10:
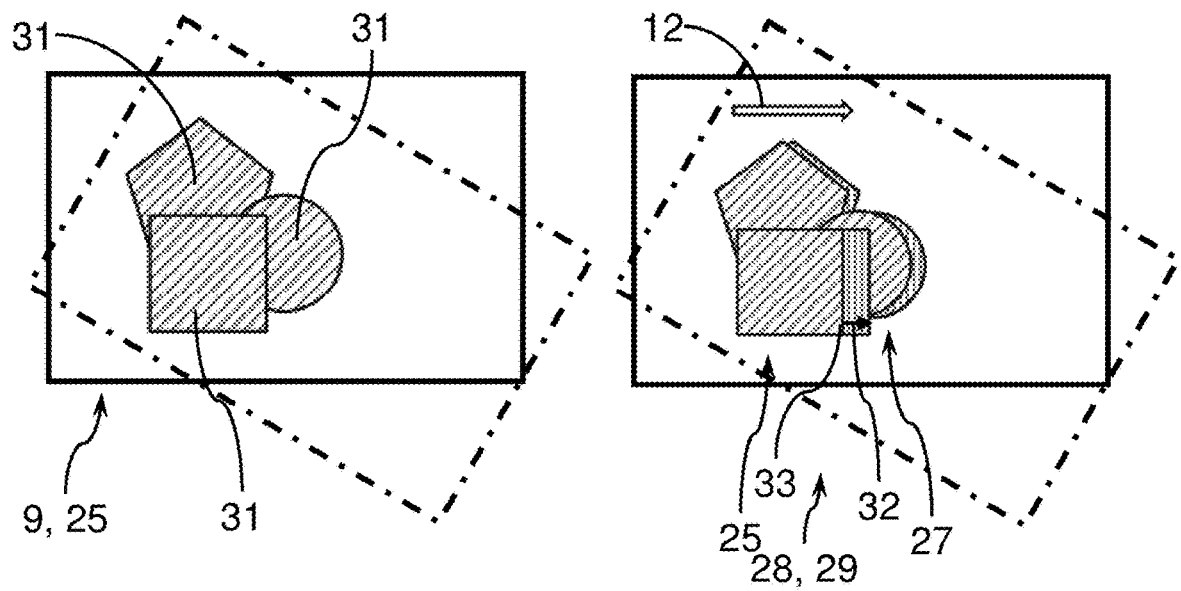
FIG. 9: shows a selected image of the image pair with respect to the stereoscopic image in accordance with FIG. 6, FIG. 10: shows the calculation of a stereoscopic image from the selected image in accordance with FIG. 9, FIG. 11: shows a flowchart of a stereoscopic image recording method.

The complementary image 27—as right image in the example—together with the rotated selected image 25 forms a transformed image pair 28, FIG. 10. The transformed image pair 28 defines a stereoscopic image 29, the depth information of which corresponds to the transformed depth information 26. This stereoscopic image 29 has a horizontally aligned disparity 12 again and can thus be perceived spatially again.

Figure 11:
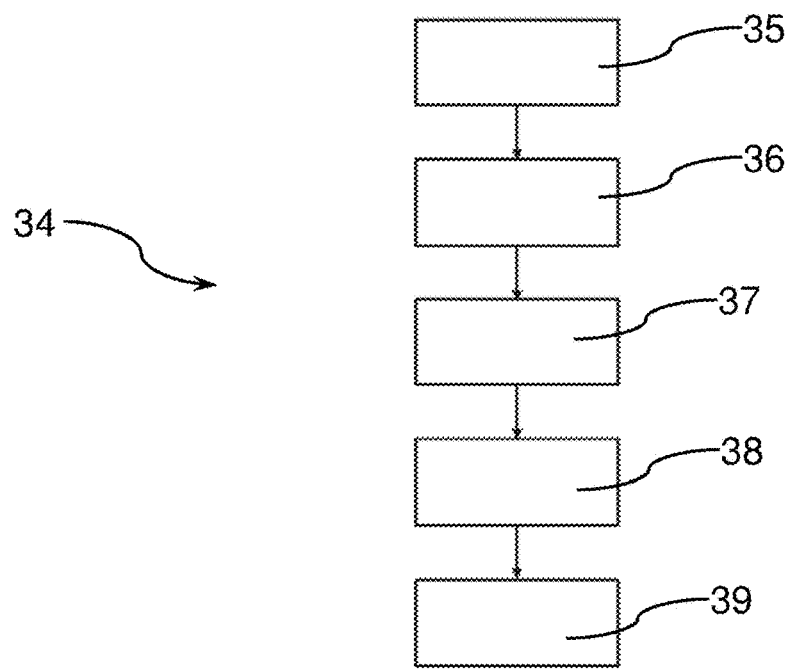

A stereoscopic image recording method 34 depicted in FIG. 11 thus proceeds recurrently in the image processing apparatus 1.

The recording of an image pair 40 in accordance with FIG. 5 as a starting point or input variable of the image recording method 34 is not illustrated in further detail.

In an angle determining step 35, firstly the alignment angle 23 is determined.

In a depth information calculating step 36, the depth information 13 is then calculated, for example as a disparity map.

In a rotation step 37, the selected image 25 and the depth information 13 are rotated by the alignment angle 23. Transformed depth information 26 is thus present.

In an image calculating step 38, a complementary image 27 is calculated with respect to the rotated selected image 25, for example on the basis of the formula $R(x,y)=L(x+dx,y+dy)$, where R denotes the complementary image 27, L denotes the rotated selected image 25, and $(dx,dy)$ denotes the local disparity 12 in accordance with the transformed depth information 26.

In an output step 39, the rotated selected image 25 and the complementary image 27 are output as a transformed image pair 28 in the form of a stereoscopic image 29.

These method steps are carried out again with close repetition over time.

In a stereoscopic image recording method 34, it is thus proposed to transform depth information 13 with respect to an image pair 40 of a stereoscopic image 24 on the basis of an alignment angle 23 in order to generate an aligned stereoscopic image 29, the transformed depth information 26 being used in order to generate a complementary image 27 of the stereoscopic image 29 in a computer-aided manner.

LIST OF REFERENCE SIGNS

1 Stereoscopic image processing apparatus
2 Left image recorder
3 Right image recorder
4 Viewing direction
5 Distance
6 Scene
7 Object
8 Object
9 Left image
10 Right image
11 Epipolar direction
12 Disparity
13 Depth information
14 Endoscope
15 Shaft
16 Proximal end
17 Camera head
18 Distal end
19 Side view unit
20 Viewing direction
21 Longitudinal axis
22 Angle measuring device
23 Alignment angle
24 Stereoscopic image
25 Selected image
26 Transformed depth information
27 Complementary image
28 (Transformed) image pair
29 Stereoscopic image
30 Preferred direction
31 Local image content
32 Corresponding distance
33 Image pixels
34 (Stereoscopic) image recording method
35 Angle determining step
36 Depth information calculating step
37 Rotation step
38 Image calculating step
39 Output step
40 Image pair

The invention claimed is:

1. A stereoscopic image recording method (34) for the positionally correct positioning of images of a stereoscopic image (29) during a rotation, comprising:
   recording an image pair (40) by a stereoscopic endoscope (14);
   said stereoscopic endoscope (14) being a side view endoscope, wherein a side view unit (19) is embodied at a distal end (18) of said side view endoscope (14) so that a viewing direction (20) of said stereoscopic endoscope (14) is angled relative to a longitudinal axis (21) of a shaft (15), wherein said stereoscopic endoscope (14) has an angle measuring device (22), said angle measuring device (22) being configured to detect an alignment angle (23) by which the stereoscopic endoscope (14) is rotated;
   calculating depth information (13) from the image pair (40);
   determining an alignment angle (23) by the angle measuring device (22), wherein the alignment angle (23) describes a position of the image pair (40) in relation to a preferred direction (30);
   transforming the depth information (13) based on the alignment angle (23); using the transformed depth information (26) for calculating at least one transformed image pair (28); and
   outputting the transformed image pair (28) as the stereoscopic image (29) so that a position of an image horizon in a stereoscopic image is maintained even during a rotation.

2. The stereoscopic image recording method (34) as claimed in claim 1, wherein, for calculating the transformed image pair (28), the method further comprises applying the transformed depth information (26) to a selected image (25) of the recorded image pair (40) and generating a complementary image (27), such that the selected image (25) and the complementary image (27) define the stereoscopic image (29).

3. The stereoscopic image recording method (34) as claimed claim 2, wherein, for generating the complementary image (27), the method further comprises displacing local image contents (31) of the selected image (25) by a distance (32) corresponding to the depth information (13).

4. The stereoscopic image recording method (34) as claimed in claim 1, further comprising selecting a search direction for calculating the depth information (13) along an image edge of at least one image (9, 10) of the image pair (40).

5. The stereoscopic image recording method (34) as claimed in claim 4, wherein the depth information (13) is calculated as a depth map, with ascertainment of content-related correspondences in the image pair (40) along a search direction.

6. The stereoscopic image recording method (34) as claimed in claim 5, wherein the search direction is predefined by an epipolar direction (11).

7. The stereoscopic image recording method (34) as claimed in claim 1, wherein the image pair (40) is recorded recurrently over time.

8. The stereoscopic image recording method (34) as claimed in claim 1, further comprising rotating a selected image of the recorded image pair (40) by the alignment angle (23).

9. The stereoscopic image recording method (34) as claimed in claim 1, further comprising rotating the depth information (13) by the alignment angle (23) in order to generate the transformed depth information (26).

10. A stereoscopic image processing apparatus (1), configured for carrying out the method as claimed in claim 1.

11. The stereoscopic image recording method (34) as claimed in claim 1, wherein the preferred direction (30) is a horizontal direction.

* * * * *